United States Patent
Barrero Serrano et al.

(10) Patent No.: US 6,185,874 B1
(45) Date of Patent: Feb. 13, 2001

(54) DOOR MODULE

(75) Inventors: Felipe Barrero Serrano; Cesar Marcos Gonzales; Jose Ignacio Gonzales Saiz; Francisco Javier Martinez Moral; Alberto Manso Moneo; Antonio Romero Magarino, all of Burgos; Ricardo Manzanas Rodriguez, Torquemada, all of (ES)

(73) Assignee: Grupo Antolin Ingenieria, S.A., Burgos (ES)

( * ) Notice: Under 35 U.S.C. 154(b), the term of this patent shall be extended for 0 days.

(21) Appl. No.: 09/341,544

(22) PCT Filed: Nov. 12, 1998

(86) PCT No.: PCT/ES98/00307

§ 371 Date: Sep. 9, 1999

§ 102(e) Date: Sep. 9, 1999

(87) PCT Pub. No.: WO99/25576

PCT Pub. Date: May 27, 1999

(30) Foreign Application Priority Data

Nov. 13, 1997 (ES) .................................................. 9702377

(51) Int. Cl.$^7$ ........................................................ B60J 5/04
(52) U.S. Cl. ................................................................ 49/502
(58) Field of Search .............................. 49/502, 340, 344, 49/345; 296/146.2, 146.7, 146.11, 146.5

(56) References Cited

U.S. PATENT DOCUMENTS

| 4,648,208 | * | 3/1987 | Baldamus et al. . |
| 5,033,236 | * | 7/1991 | Szerdahelyi et al. . |
| 5,647,171 | * | 7/1997 | Wirsing et al. ........................ 49/502 |

FOREIGN PATENT DOCUMENTS

| 0286923 | * | 10/1988 | (EP) . |
| 9728977 | * | 8/1997 | (WO) . |
| 9842527 | * | 10/1998 | (WO) . |

* cited by examiner

Primary Examiner—Jerry Redman
(74) Attorney, Agent, or Firm—Browdy And Neimark

(57) ABSTRACT

A door model comprising a totally function unit including on a basic body a side reinforcement, an internal opening control and an external opening control with a vibration absorbent sheet, an inner upper reinforcement of the base body, a window winder, a locking device, a vibration absorbent support, a window pane, and window pane guides. The unit is assembled into a door by inserting glass that protrudes therefrom onto a rear guide in the door, supporting the unit firstly in the area of the lock and later completing fixing by bolts or similar items in the area of the hinges.

4 Claims, 1 Drawing Sheet

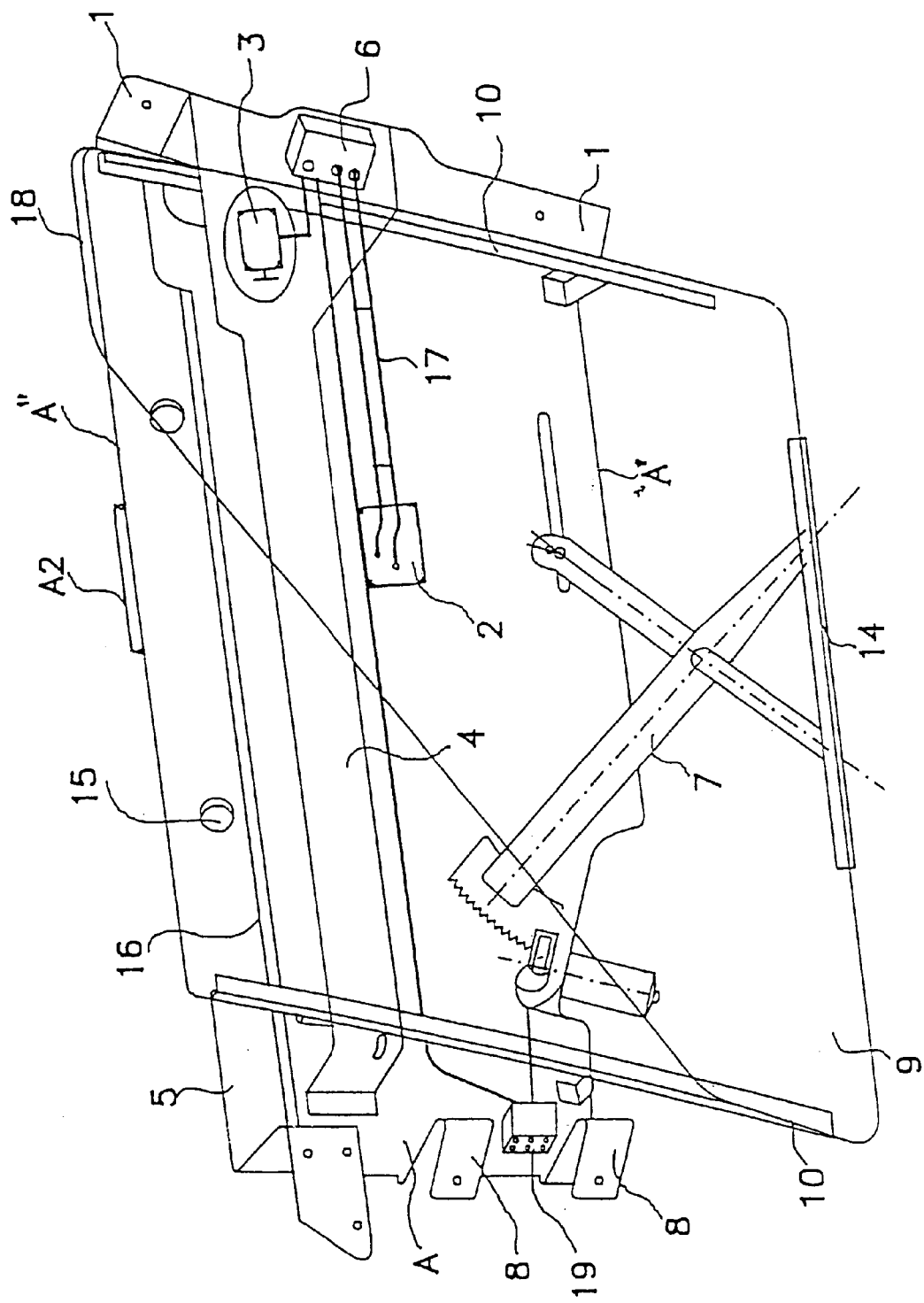

DOOR MODULE

CROSS REFERENCE TO RELATED APPLICATION

The present application is the national stage under 35 U.S.C. 371 of PCT/ES98/00307, filed Nov. 12, 1998.

FIELD OF THE INVENTION

BACKGROUND OF THE INVENTION

This invention relates to a door module applicable to automobile vehicles. Insofar as is known concerning the different components of vehicle doors, these components are mostly fitted into the door or into the door module on the assembly line and submitted to unitary and assembly operational tests as they are incorporated into the base module.

This way of proceeding causes a considerable number of problems in assembly, which in turn cause time to be lost, as well as inaccuracies and tolerance deficiencies, which lead to an increase in production costs.

Some attempts have been made to mount some of the door components on board primary units. Nevertheless, the production of totally functional units has not been achieved.

SUMMARY OF THE INVENTION

One basic objective of the invention, therefore, is to provide a door module which is completely functional and operative.

Another objective of the invention is to provide a door module that is fixed to the door quickly and easily.

In order to put these two objectives into practice, the door module in accordance with the invention consists of the following basic elements: a base part with an upper reinforcement determined by a part that extends from the position of the lock to the area of the hinges. Situated in the lock portion is a vertical lock reinforcement, which is secured to the end of the previously mentioned upper reinforcement.

In an approximately parallel position to the said upper reinforcement of the base part is positioned a vibration absorbent support which, in the same way, runs from the hinge area to the lock area, extending in this area based on a U-shaped portion in a vertical position that takes inn the lock in its inner base, while on its exterior it receives the previously mentioned outer lock reinforcement.

The base part extends at its lower end and receives ends of the window winder device included in the module, as well as the two guides that hold the window pane between them. The window winder device is provided with two lower ends that connect to the lower edge of the window pane and the window winder system is driven by means of a motor housed on board the base part.

The inner upper reinforcement of the base part is provided with holes in order to receive the corresponding trim and also receives the internal opening control, connected to the lock by the appropriate means.

The vibration absorbent support includes the external opening control which, in turn, is connected to the lock by other means.

With these basic elements, the module is placed in the door, the window pane that protrudes from it is inserted onto the rear guide in the door, it is supported firstly in the area of the lock and fixing is then completed by means of screws or similar items in the area of the hinges.

The door module, as it has been described, can use a male-female connector in order to achieve electrical communication between the electrical items situated in the module and the rest of the circuit situated in the automobile.

In the same way, it is possible to use another male-female connector in order to achieve electrical communication between the electrical items situated in the module itself and those situated in the door interior trim.

The module in accordance with the invention can be complemented with the incorporation of other items or systems, without any restriction on the number or quality of these, such as an internal window seal, a loudspeaker, side protection systems or other means of anti-impact security such as an airbag, and even a rear view mirror.

BRIEF DESCRIPTION OF THE DRAWING

The drawing figure shows a door module according to the present invention.

DETAILED DESCRIPTION OF THE INVENTION

The accompanying sheet of drawings allows us to appreciate a perspective of one practical application of the invention for purposes of greater understanding of what has been described so far and, of course, without this being restrictive in any way.

In this perspective we can appreciate the inner base part (A) of the door module, with the inner upper reinforcement (5) in its upper portion, going from the area of the lock (6) to the area of the hinges (8). As can be observed, this upper area is reinforced mechanically, for instance by means of a double plate (A2) and a rib (16), as shown.

The base (A) extends from the top (A") towards the bottom (A'), where it receives the window winder system (7), the drive motor (not numbered in this diagram), while the upper portion has the holes (15) for fixing.

The base (A) includes the two side guides (10) for the window pane (9) that extend to its upper end (18), operated by the action of the window winder (7) that is connected to the lower portion (14).

The part (4) or vibration absorbent support extends towards the right end where the lock (6) is situated, and includes the vertical reinforcement on the exterior (1).

We can appreciate the positions of the internal control (2) connected by means of (17) to the lock (6) and assembled on the base (A), as well as the external control (3), also connected to the lock.

The base part (A) has the area of the hinges (8) where one of the previously mentioned electrical connectors (19) can also be observed.

Once having described the nature and advantages of this invention, it is important to point out its non-restrictive character, inasmuch as changes in the shape, materials or dimensions of its constituent parts will not in any way alter its essence, as long as they do not mean a substantial variation of the whole assembly.

What is claimed is:

1. A door module to be inserted into the body of a vehicle door, said vehicle door including an area of hinges and a lock portion, said door module comprising:
   a base part with having an upper reinforcement, said upper reinforcement comprising a part that extends from the lock portion of the door to the area of the hinges of the door;

a vertical lock reinforcement located in the lock portion of the door, said vertical lock reinforcement secured to said upper reinforcement;

a vibration absorbent support, said vibration absorbent support runs approximately parallel to said upper reinforcement, said vibration absorbent support runs from the hinge area of the door to the lock area of the door, said vibration absorbent support being U-shaped in a vertical position and encompassing the lock in the inner base of said vibration absorbent support and said vertical lock reinforcement in the exterior of said vibration absorbent support;

said base part extends at its lower end and receives ends of a window winder device and two guides that hold a window pane between said two guides;

said window winder device is provided with two lower ends that connect to the lower edge of the window pane;

a motor housed on board the base part to drive the window winder device;

said upper reinforcement provided with holes to receive corresponding trim and internal opening control connected to the lock.

2. The door module according to claim 1 wherein a male-female connector provides electrical communication among electrical items in the door module and the electrical circuit situated in the automobile.

3. The door module according to claim 1 wherein a male-female connecter provides electrical communication between electrical items in said door module and electrical items arranged inside the inner door trim.

4. The door module according to claim 1 further comprising at least one of an internal window seal, a rear view mirror control, loudspeaker, hands free kit, side protection padding, and airbags.

* * * * *